Figure 1:
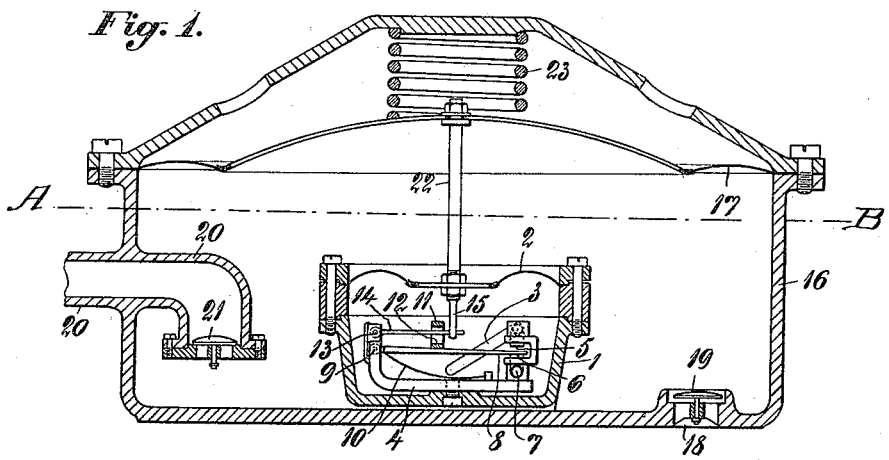

G. DALÉN.
APPARATUS FOR MIXING GASES.
APPLICATION FILED DEC. 28, 1910.

1,153,766.

Patented Sept. 14, 1915.
2 SHEETS—SHEET 1.

WITNESSES
W. P. Burk
John C. Sanders

INVENTOR
Gustaf Dalén
BY
[signature]
ATTY.

G. DALÉN.
APPARATUS FOR MIXING GASES.
APPLICATION FILED DEC. 28, 1910.

1,153,766.

Patented Sept. 14, 1915.
2 SHEETS—SHEET 2.

UNITED STATES PATENT OFFICE.

GUSTAF DALÉN, OF STOCKHOLM, SWEDEN, ASSIGNOR TO SVENSKA AKTIEBOLAGET GASACCUMULATOR, OF STOCKHOLM, SWEDEN.

APPARATUS FOR MIXING GASES.

1,153,766.  Specification of Letters Patent.  Patented Sept. 14, 1915.

Application filed December 28, 1910. Serial No. 599,652.

*To all whom it may concern:*

Be it known that I, GUSTAF DALÉN, subject of Sweden, residing at Stockholm, Sweden, have invented new and useful Improvements in Apparatus for Mixing Gases, of which the following is a specification.

When a gas mixture is employed for gas lighting purposes it is important, that the gases, of which the mixture is composed, are present in certain determined proportions, in order to obtain a complete combustion and a high lighting effect. To this object the gases to be mixed, say acetylene and air, must be exactly proportioned by means of a special device before being mixed with one another.

In most cases one of the gases to be mixed is under pressure, it may be owing to the development or owing to the storing of the same.

The present invention has for its object an apparatus, in which the pressure of one of the gases to be mixed is utilized for automatically proportioning and mixing the gases. For this purpose according to this invention two or more chambers are provided, closed by simultaneously movable members, which under the influence of the pressure of one of the gases to be mixed allow exactly proportioned quantities of the gases to be admitted to the said chambers. By means of automatically working cutting off devices the admission of gas under pressure is cut off and the gas pressure chamber is connected with a chamber or conduit, in which the gases are mixed. The quantities of gases admitted to the said chambers are thereby introduced in determined proportions and intimately mixed with one another in said conduit or chamber under the control of the pressure members.

For the purpose of exactly proportioning the quantities of the gases introduced in the said chambers and controlled by the cutting off devices, said devices are suddenly moved from their end positions and the movable members, actuating said devices, are running idle during a part of their strokes.

As the connection between the above mentioned conduit or chamber, in which the gases are mixed, and the gas chambers is interrupted during the filling stroke of the movable members, closing the said gas chambers, the pressure in the consumption conduit will be diminished during said filling stroke. To avoid this diminishing of pressure, the conduit is connected with a storing chamber, closed by a movable pressure member, to which storing chamber each of the gases or the ready gas mixture is delivered during the delivery stroke of the members of the gas chambers. From this storing chamber the gases or gas mixture is introduced into the consumption conduit during the filling stroke of said members. The quantity of gas mixture delivered to said storing chamber is controlled so as to correspond to the consumption by means of a controlling device actuated by the pressure member closing the storing chamber. In this manner the quantity of gas mixture escaping from the conduit or chamber in which the gases are mixed, and feeding the consumption conduit and the storing chamber during the delivery stroke of the gas chamber members, will be controlled according to the consumption, whereas in the storing chamber a quantity of gas mixture always will be stored, covering a suddenly augmented consumption.

Figure 2:
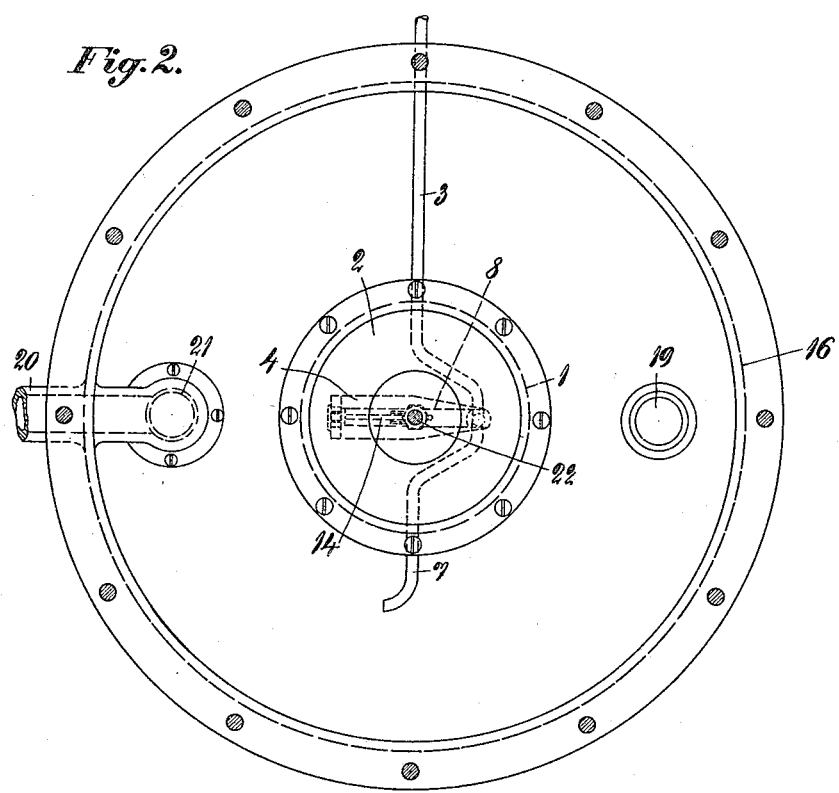
Figure 3:
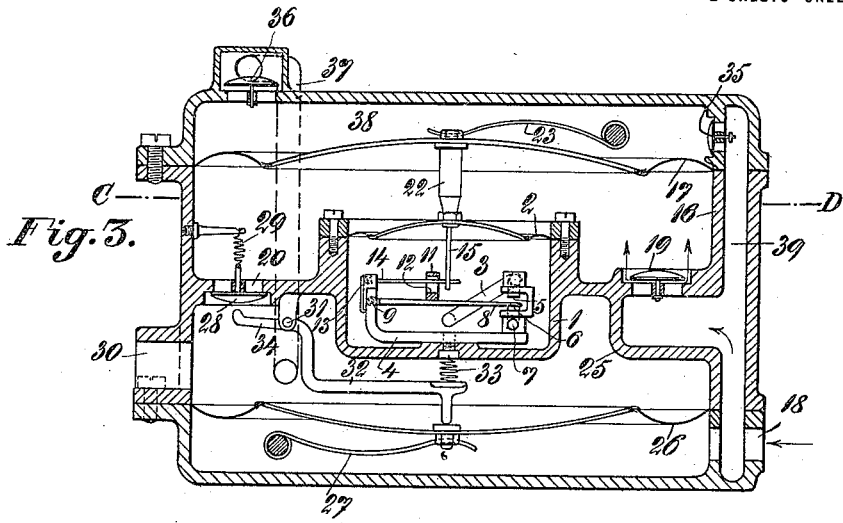
Figure 4:
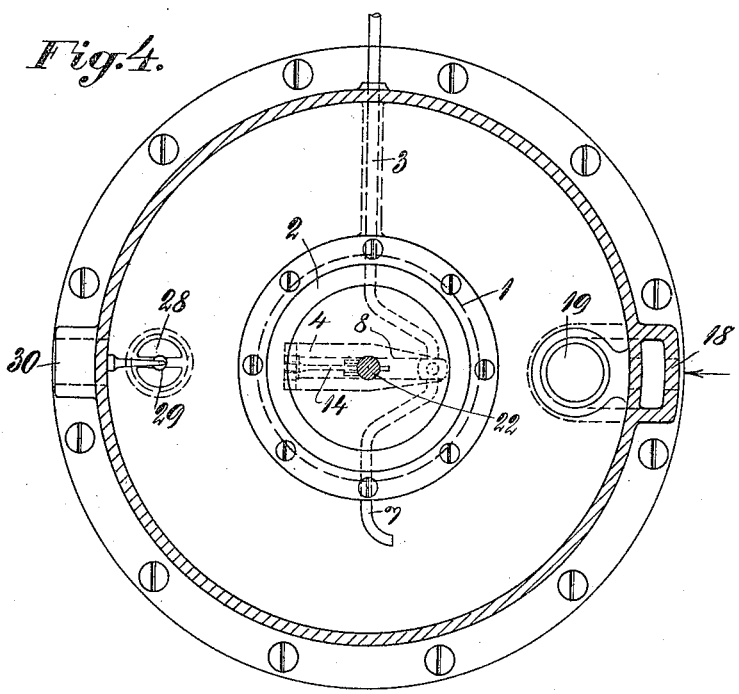

In the drawings Figure 1 is a vertical section of the apparatus without storing chamber, Fig. 2 is a horizontal section on line A—B in Fig. 1, Fig. 3 is a vertical section of the apparatus with storing chamber, and Fig. 4 is a horizontal section on line C—D in Fig. 3.

With reference to the apparatus shown in Figs. 1 and 2, which is assumed to be employed for mixing acetylene and air for lighting purposes, 1 indicates a chamber or casing, which is closed by a movable member such as the diaphragm 2.

3 indicates an inlet pipe, conducting acetylene under pressure to the chamber or casing 1 and terminating in a valve seat 5, carried by a stud 4. Opposite to said valve seat 5 another valve seat 6 is provided, connected with an outlet pipe 7. Between the two valve seats 5 and 6 a valve plate 8 is provided, rocking on points 9 and actuated by a spring 10, tending to hold the valve plate toward the valve seat 5.

For the purpose of suddenly opening and closing the valve seats 5 and 6, the valve plate 8 constitutes a permanent magnet, whereas the valve seats are made of soft iron, whereby the magnetism is made somewhat stronger than the pressure of the spring 10. On the valve plate 8 two shoulders 11, 12 are provided, the distance between which determines the quantity of acetylene, which will be introduced in the casing 1. Between said shoulders a lever 14 is fulcrumed in a bearing 13 on the stud 4, and connected at its free end to a bar 15, which is connected to the diaphragm 2. In the present instance a lug projects upwardly from the top of the valve plate 8 and has formed therein a vertically elongated slot through which the lever 14 passes, the upper and lower walls of said slot form shoulders 11 and 12 with which the lever engages to raise and lower the valve plate.

The chamber or casing 16, which is intended to receive the air, is closed by a movable member such as the diaphragm 17. An air inlet 18, provided with a suction valve 19, opens in said chamber or casing 16, from which leads a delivery pipe 20, provided with a pressure valve 21.

In the construction shown in Figs. 1 and 2 the casing 1 is placed within the casing 16, and the two diaphragms 2 and 17 are connected by means of a bar 22 so as to move simultaneously. The diaphragm 17 is actuated by a spring 23, the strength of which is less than the pressure of gas, introduced through the inlet pipe 3. The delivery pipe 7 opens in the casing 16, which thus serves as mixing chamber.

The apparatus works in the following manner: In the position of the parts shown on the drawing, the valve plate 8 closes the communication between the casings 1 and 16, and the acetylene gas flows under pressure into the casing 1 through the inlet pipe 3 and the valve seat 5. Under the influence of the pressure of the acetylene gas the diaphragm 2 and also the diaphragm 17, connected therewith, rise, overcoming the strength of the spring 23, until the lever 14 engages the shoulder 11 and pulls the valve plate 8 from its seat 6, against which the valve plate has been held by means of magnetism during said filling stroke of the diaphragms 2 and 17. The casing 1 will thus be put in communication with the casing 16, and the valve plate 8 will be thrown toward the seat 5 under the action of the spring 10, so that the introduction of acetylene is interrupted. During said stroke of the diaphragm 17 a vacuum is created in the chamber or casing 16, so that the suction valve 19 is opened and air flows into said chamber 16. When the casing 1 is put in communication with the casing 16 as above mentioned the pressure in the casing 1 is diminished. As soon as said pressure is overcome by the strength of the spring 23, the diaphragms 2 and 17 will be forced back to their original position by said spring. During this stroke of the diaphragms the gas in the casing 1 will flow into the casing 16, in which it is mixed with the air, contained therein, and part of said mixture of gas and air will simultaneously be delivered from the casing 16 through the valve 21 and into the conduit 20. At the end of the delivery stroke of the diaphragms 2 and 17 the lever 14 will engage the shoulder 12, whereby the valve plate 8 will be pulled from the seat 5 to the seat 6 against the action of the magnetism and the spring 10. Hereby the casing 1 will be put in communication with the inlet pipe 3 and out of communication with the casing 16, so that the filling stroke of the diaphragms 2 and 17 will again begin. The quantity of acetylene gas, introduced in the casing 1 during the filling stroke of the diaphragm 2, is dependent on the distance between the shoulders 11 and 12, that is on the idle movement of the lever 14. Said quantity of acetylene gas may thus be controlled by varying said idle movement. The amount of air entering the casing 16 depends on the length of the filling stroke of the diaphragm and also its area. By varying said area the quantity of air to be mixed with the acetylene gas can be varied.

By placing the casing 1 within the casing 16 and introducing the gas from the casing 1 to the casing 16 an intimate mixture of gas and air and a narrow construction is obtained. However the invention is not limited to the illustrated arrangement of said chambers or casings. During the filling stroke of the diaphragms 2 and 17 the delivery pipe 20 is put out of communication with the casings 1 and 16, whereby the pressure will be diminished in said pipe at a constant consumption of the gas mixture. Such variations of pressure are obviated when using the apparatus shown in Figs. 3 and 4, by means of which the delivery of gas mixture from the delivery pipe is controlled so as to correspond to the consumption of gas mixture.

The device for mixing gas and air is the same as that described with reference to Figs. 1 and 2, and the same parts are indicated by the same references, so that further description of the same is not necessary.

The lower part of the casing 16 communicates with a storing chamber 25, which is closed by a movable member such as the diaphragm 26, which is actuated by the spring 27. The check valve 28 which is pressed toward its seat by a spring 29, opens downward, so that the gas mixture flows from the casing 16 at each pulsation of the diaphragm 17 into the storing chamber 25, which communicates with the consumption conduit 30.

During the delivery stroke of the diaphragms 2 and 17 the gas mixture flows through the opening 20 and past the valve 28 into the storing chamber 25 and from this latter into the consumption conduit 30. Hereby the storing chamber will be filled with gas mixture, the diaphragm 26 moving outward. When the check valve 28 is closed during the filling stroke of the diaphragms 2 and 17, the storing chamber 25 will alone feed the consumption conduit 30 with gas mixture, whereby the diaphragm 26 will move inward under the action of the spring 27 in correspondence to the gas consumption. The dimensions of the storing chamber 25 are proportioned in such a manner, that it will receive at least the quantity of gas mixture, corresponding to that flowing into the consumption conduit during the delivery stroke of the diaphragms 2 and 17, and for this reason the pressure in said conduit will not be diminished. The storing chamber also serves as a pressure regulating device during the delivery stroke of the diaphragms 2 and 17, acting as a buffer for the pressure shocks, generated during said delivery stroke, whereby the pressure in the consumption conduit will be constant.

In order to control the quantity of gas mixture delivered from the mixing chamber 16, so as to correspond to the gas consumption, the pressure valve 28 is controlled by the diaphragm 26. For this purpose a lever 32, 34 is fulcrumed on a pivot 31 in the chamber 25, one arm 32 of said lever being pressed by a spring 33 toward the diaphragm 26, the other arm 34 being placed in front of the pressure valve 28, limiting its stroke.

At normal consumption the arm 34 is situated at such a distance from the valve 28 at the beginning of the delivery stroke of the diaphragms 2 and 17, that the valve 28 can move its full stroke. If now the gas consumption diminishes, the pressure in the storing chamber will rise before the diaphragm 26 has occupied its end position. The arm 34 is thus in the path of the stroke of the pressure valve 28. At the beginning of the delivery stroke of the diaphragms 2 and 17 the pressure valve 28 thus can only open to an extent, determined by the position of the diaphragm 26, which position is depending on the consumption for the moment. The storing chamber 25 will be filled during the delivery stroke, after which the pressure valve 28 is closed, and delivers the gas mixture alone to the consumption conduit 30 during the filling stroke of the diaphragms 2 and 17.

If the consumption of gas mixture suddenly be augmented the storing chamber 25 will always contain a sufficient amount of gas mixture to keep the pressure in the consumption conduit constant.

In the construction illustrated the mixing casing or chamber 16 is directly connected with the storing chamber 25 through the pressure valve 28, whereby said valve simultaneously serves as a pressure regulating valve. Hereby the construction is made very narrow, and a special pressure regulating valve for the storing chamber will be unnecessary, such regulating valve being necessary in cases when the storing chamber is arranged separate from the mixing apparatus.

The apparatus can be arranged so as to provide for an increased quantity of gas mixture without increasing the dimensions of the apparatus, by causing the diaphragm 17 to suck in air during both strokes. For this purpose the chamber 38 above the diaphragm is made to communicate with the open air and with the air inlet 18 through the channel 39, said channel terminating in a suction valve 35, opening into the chamber 38. The chamber 38 is also in communication with the storing chamber 25 by means of a conduit 37, in which communication a pressure valve 36 is provided. During the downward stroke of the diaphragm 17, air is sucked into the chamber 38, which air during the following upward stroke of the diaphragm is pressed into the storing chamber 25, in which it will be mixed with the gas mixture, introduced therein during the first mentioned stroke of the diaphragm 17. For maintaining the proper proportions between the acetylene and the air the diaphragm 2 is made relatively large, so that a relatively large quantity of gas is introduced in the casing 1 during the filling stroke of the diaphragm 2. Such augmenting of the diaphragm 2 does not affect the dimensions of the chamber 16 nor the dimensions of the apparatus as a whole. The chamber 25 will in this case act both as a storing chamber and as a mixing chamber.

What I claim is:—

1. In an air and gas mixer, a mixing chamber having a flexible wall and provided with an air inlet and an outlet for the mixed air and gas, a gas inlet for admitting gas under pressure to said chamber, and means controlled by the pressure of the gas to be mixed for periodically actuating said flexible wall of the mixing chamber to produce a partial vacuum in said mixing chamber on one stroke of the diaphragm to draw air into said chamber, and to discharge mixed air and gas therefrom on the other stroke of the diaphragm.

2. In an air and gas mixer, a mixing chamber having a flexible wall provided with valve controlled inlet and outlet ports, a gas chamber having a flexible wall, a connection between said flexible walls, an inlet for delivering gas under pressure to said gas chamber, a conduit connecting the two chambers, and means controlled by the pressure of the gas in the gas chamber to intermittently actuate the said flexible walls whereby to control the entrance of air into the mixing chamber.

3. In an air and gas mixer, a mixing chamber having a flexible wall and provided with valve controlled inlet and outlet ports, a gas chamber having a flexible wall, a connection between the flexible walls of said chambers, a valve controlled inlet for delivering gas under pressure to said gas chamber, a valve controlled gas outlet conduit connecting the two chambers, and means actuated by the pressure of the gas in the gas chamber for actuating the said flexible walls to produce a partial vacuum in said mixing chamber and thereby draw air into the mixing chamber on one stroke of the flexible walls and alternately open and close the gas inlet and gas outlet conduit.

4. In an air and gas mixer, a mixing chamber having a movable wall and provided with valve controlled inlet and outlet ports, a gas chamber having a movable wall, an operative connection between the movable walls of said chambers, a gas inlet delivering gas under pressure to the gas chamber, and a gas outlet leading therefrom to the mixing chamber, and valve means located within said gas chamber for controlling the last named inlet and outlet, said valve means being controlled in its operation by the pressure of the gas in the gas chamber.

5. In an air and gas mixer, a mixing chamber having a flexible wall and provided with inlet and outlet ports, a gas chamber having a flexible wall, an operative connection between the flexible walls of said chambers, a gas inlet for delivering gas under pressure to the gas chamber and a gas outlet leading therefrom to the mixing chamber, valve means for said gas inlet and said gas outlet, and means for actuating said valve means to alternately open said gas inlet and said gas outlet, said last means being arranged to be controlled in its operation by the gas pressure in the gas chamber.

6. In an air and gas mixer, a mixing chamber having a flexible wall constituting a pulsator and provided with valve controlled inlet and outlet ports, a gas chamber having a flexible wall, an operative connection between the flexible walls of said chambers, a gas inlet delivering gas under pressure to the gas chamber, and an outlet leading therefrom to the mixing chamber, means controlled by the pressure of gas in the gas chamber for intermittently pulsating the flexible wall of the mixing chamber, whereby to periodically draw air into the same through its valve-controlled inlet port and discharge mixed air and gas therefrom through its valve-controlled outlet port, and a vibrating valve actuated by the same means for alternately opening and closing said gas inlet and gas outlet conduit.

7. In a gas mixer, a mixing chamber having a flexible wall constituting a pulsator and provided with valve controlled inlet and outlet ports, a second chamber having a valve controlled inlet and a valve controlled outlet leading into the mixing chamber, and automatic means controlled by the pressure of one of the fluids to be mixed, for intermittently reciprocating said flexible wall, whereby to periodically produce a partial vacuum in said chamber, and thereby draw the other fluid to be mixed into the mixing chamber through the inlet port on one stroke of said flexible wall and discharge the fluid mixture therefrom through the outlet port on the other stroke.

8. In an air and gas mixer, a mixing chamber having a flexible wall constituting a pulsator, and said chamber having valve-controlled inlet and outlet ports, a gas chamber located within and wholly inclosed by the mixing chamber, said gas chamber having a flexible wall, an operative connection between the said flexible walls, a gas inlet leading to the gas chamber and an outlet leading therefrom to the mixing chamber, and an intermittently actuated valve within the gas chamber for alternately opening and closing said gas inlet and outlet and controlled by the gas pressure in said gas chamber to regulate the admission and exhaust of gas therefrom for periodically actuating the said flexible walls of the chambers to alternately draw air into the mixing chamber and discharge mixed air and gas therefrom.

9. In an air and gas mixer, a mixing chamber having a flexible wall and provided with an air inlet and an outlet for the mixed air and gas, a valve controlled gas inlet for periodically admitting gas under pressure to said chamber whereby said flexible wall is alternately expanded and collapsed to produce a partial vacuum in the mixing chamber and thereby draw air into the chamber on one stroke of said flexible wall and force mixed air and gas therefrom on the other stroke of said flexible wall.

10. In an air and gas mixer, a mixing chamber having a movable wall constituting a pulsator and provided with valve controlled inlet and outlet ports, a gas chamber having a movable wall, an operative connection between the movable walls of said chambers, a gas inlet delivering gas under pressure to said gas chamber, a gas outlet leading therefrom to the mixing chamber, and a vibrating valve in said gas chamber operatively connected to the movable wall thereof for alternately opening and closing the gas inlet and outlet and periodically admitting gas into and exhausting it from said gas chamber to actuate said movable walls.

11. In an air and gas mixer, a mixing chamber having a movable wall constituting a pulsator and provided with valve controlled inlet and outlet ports, a gas chamber having a movable wall, a rigid connection between the movable walls of said chambers, a gas inlet delivering gas under pressure to said gas chamber, a gas outlet leading therefrom to the mixing chamber, a valve seat on both the gas inlet and outlet, and a vibrating valve in said gas chamber operatively connected to the movable wall thereof to alternately contact with said valve seats and open and close the gas inlet and outlet and periodically admit gas into and exhaust it from said gas chamber to actuate said movable walls.

12. In an air and gas mixer, a mixing chamber having a movable wall constituting a pulsator and provided with valve controlled inlet and outlet ports, a gas chamber having a movable wall, a rigid connection between the movable walls of said chambers, a gas inlet delivering air under pressure to said gas chamber, a gas outlet leading therefrom to the mixing chamber, a vibrating valve within said gas chamber for alternately opening and closing said gas inlet and outlet and periodically admitting gas into and exhausting it from said gas chamber to actuate said movable walls, and a connection having a limited free movement between said valve and the movable wall of the gas chamber.

13. In an air and gas mixer, a mixing chamber having a movable wall constituting a pulsator and provided with valve controlled inlet and outlet ports, a gas chamber having a movable wall, a rigid connection between the movable walls of said chambers, a gas inlet delivering air under pressure to said gas chamber, a gas outlet leading therefrom to the mixing chamber, a valve seat on both gas inlet and outlet, and a vibrating valve in said gas chamber operatively connected to the movable wall thereof for alternately opening and closing the gas inlet and outlet, said valve being magnetically attracted by one or the other of said valve seats and held in contact by said attraction to close the port therein and hold it closed until forced therefrom.

14. In an air and gas mixer, a mixing chamber having a movable wall constituting a pulsator and provided with valve controlled inlet and outlet ports, a gas chamber having a movable wall, a rigid connection between the movable walls of said chambers, a gas inlet delivering gas under pressure to said gas chamber, a gas outlet leading therefrom to the mixing chamber, a valve seat of soft iron on both gas inlet and outlet, and a vibrating valve formed of a permanent magnet adapted to alternately close and open the gas inlet and outlet and be held against one or the other by the magnetic attraction until positively forced out of contact therewith.

15. In an air and gas mixer, a mixing chamber, having a movable wall constituting a pulsator and provided with valve controlled inlet and outlet ports, a gas chamber having a movable wall within said mixing chamber, a rigid connection between the movable walls of said chambers, a gas inlet delivering gas under pressure to said gas chamber, a gas outlet leading therefrom to the mixing chamber, said inlet and outlet having opposing valve seats within the gas chamber, a vibrating valve movable between said valve seats and adapted to alternately close one or the other, a connection between said vibrating valve and the movable wall of the gas chamber for actuating said valve as said walls collapse and expand, said connection having a limited amount of free play to permit the said movable wall moving without moving the valve, and said valve being held in contact with its valve seats by magnetic attraction therebetween.

16. In an air and gas mixer, a mixing chamber having a movable wall constituting a pulsator and provided with valve controlled inlet and outlet ports, a gas chamber having a movable wall, a gas inlet delivering gas under pressure to said gas chamber, a gas outlet leading therefrom to the mixing chamber, and a vibrating valve actuated through the pulsation of the movable wall of said gas chamber to close the gas outlet while said chamber is filling through the gas inlet and close said gas inlet while the chamber is exhausting through the gas outlet.

17. In an air and gas mixer, a mixing chamber having a movable wall constituting a pulsator and provided with valve controlled inlet and outlet ports, a gas chamber having a movable wall, a gas inlet delivering gas under pressure to said gas chamber, a gas outlet leading therefrom to the mixing chamber, a vibrating valve actuated through the pulsation of the movable wall of said gas chamber to close the gas outlet while said chamber is filling through the gas inlet and close said gas inlet while the chamber is exhausting through the gas outlet, and a lost motion connection between said movable wall and the valve to permit a limited movement of said wall without actuating the valve.

18. In an air and gas mixer, a mixing chamber having a flexible wall constituting a pulsator and provided with valve controlled inlet and outlet ports, a gas chamber having a flexible wall, a gas inlet delivering gas under pressure to said gas chamber, a gas outlet leading therefrom to the mixing chamber, and a vibrating valve controlled by the flexible wall of said gas chamber for holding the gas outlet closed during expansion of said wall and filling of the gas chamber through the gas inlet and for holding said gas inlet closed during the collapsing of said wall of said gas chamber to exhaust the gas chamber, the collapsing of said flexible wall expelling the gas from the gas chamber without increasing its compression.

19. In an air and gas mixer, a mixing chamber, a gas chamber having a movable wall, a gas inlet delivering gas under pressure to said gas chamber, a gas outlet leading therefrom to the mixing chamber, and a magnetic valve device adapted to alternately close the gas inlet and the gas outlet and be held in either position magnetically.

In testimony whereof I have signed my name to this specification in the presence of two subscribing witnesses.

GUSTAF DALÉN.

Witnesses:
WALDEMAR BOMAN,
T. EKSBOHM.